(12) United States Patent
Li et al.

(10) Patent No.: US 11,522,466 B1
(45) Date of Patent: Dec. 6, 2022

(54) POWER CONVERSION STRUCTURE, POWER CONVERSION METHOD, ELECTRONIC DEVICE INCLUDING POWER CONVERSION STRUCTURE, AND CHIP UNIT

(71) Applicant: NuVolta Technologies (Hefei) Co., Ltd., Hefei (CN)

(72) Inventors: Zhengyu Li, Shanghai (CN); Junhe Zhang, Shanghai (CN); Cheong Kun, Shanghai (CN); Fuchun Zhan, Shanghai (CN); Penghao Zeng, Shanghai (CN)

(73) Assignee: NuVolta Technologies (Hefei) Co., Ltd., Hefei (CN)

( * ) Notice: Subject to any disclaimer, the term of this patent is extended or adjusted under 35 U.S.C. 154(b) by 0 days.

(21) Appl. No.: 17/752,175

(22) Filed: May 24, 2022

(30) Foreign Application Priority Data

Feb. 24, 2022 (CN) .......................... 202210168842.2

(51) Int. Cl.
  *H02M 7/483* (2007.01)
  *H02M 7/487* (2007.01)
  *H02M 3/158* (2006.01)
  *H02M 3/07* (2006.01)

(52) U.S. Cl.
  CPC ......... *H02M 7/4837* (2021.05); *H02M 3/072* (2021.05); *H02M 3/1582* (2013.01); *H02M 7/487* (2013.01)

(58) Field of Classification Search
  CPC .... H02M 7/4837; H02M 3/1582; H02J 7/025; H02J 50/10; H02J 50/05
  See application file for complete search history.

(56) References Cited

U.S. PATENT DOCUMENTS

| | | | | |
|---|---|---|---|---|
| 7,696,735 | B2* | 4/2010 | Oraw | H02M 3/07 323/282 |
| 8,427,113 | B2* | 4/2013 | Xing | H02J 7/007182 320/140 |
| 10,075,080 | B1* | 9/2018 | Scoones | H02M 3/158 |
| 10,547,241 | B1* | 1/2020 | Li | H02M 3/1588 |

(Continued)

FOREIGN PATENT DOCUMENTS

| CN | 108028600 A | 5/2018 |
|---|---|---|
| CN | 110601535 A | 12/2019 |

(Continued)

*Primary Examiner* — Yusef A Ahmed
(74) *Attorney, Agent, or Firm* — Slater Matsil, LLP

(57) ABSTRACT

An output terminal of one phase switched capacitor converter is connected to a first output terminal, and an output terminal of the other phase switched capacitor converter is connected to the first output terminal via a second switch, such that the power conversion structure can operate in a mode of two phase switched-capacitor converters in parallel, and a current formed by the operating of only one phase switched capacitor converter flows through the second switch, thus greatly reducing a value of current flowing through the second switch, greatly reducing the on-state loss of the second switch, and improving the efficiency of the power conversion structure, and because the second switch has lower on-state loss and less heat, there is a larger selectivity of the second switch and a reduction of the cost of power conversion structure.

17 Claims, 10 Drawing Sheets

(56) References Cited

U.S. PATENT DOCUMENTS

| | | | |
|---|---|---|---|
| 10,615,686 B2 * | 4/2020 | Woo | H02M 3/07 |
| 10,727,747 B2 * | 7/2020 | Macri | H02M 7/4837 |
| 10,734,898 B1 * | 8/2020 | Arnold | H02M 3/158 |
| 11,190,097 B2 * | 11/2021 | Lee | H02M 1/0095 |
| 11,411,491 B2 * | 8/2022 | De | H02M 3/155 |
| 11,451,151 B1 * | 9/2022 | Liu | H02M 1/0095 |
| 2007/0296383 A1 * | 12/2007 | Xu | H02M 7/4837 |
| | | | 323/282 |
| 2008/0157723 A1 * | 7/2008 | Xing | H02J 7/02 |
| | | | 320/164 |
| 2008/0239772 A1 * | 10/2008 | Oraw | H02M 7/4837 |
| | | | 363/60 |
| 2009/0033293 A1 * | 2/2009 | Xing | H02M 3/1588 |
| | | | 323/284 |
| 2009/0108888 A1 | 4/2009 | Gebara et al. | |
| 2015/0207401 A1 * | 7/2015 | Zhang | H02M 3/07 |
| | | | 323/271 |
| 2017/0055322 A1 * | 2/2017 | Jiang | H02M 3/07 |
| 2017/0244318 A1 | 8/2017 | Giuliano | |
| 2017/0338748 A1 * | 11/2017 | Liang | H02M 7/483 |
| 2018/0026518 A1 * | 1/2018 | Liu | H02M 3/1584 |
| | | | 323/312 |
| 2019/0207519 A1 * | 7/2019 | Chakraborty | H02M 1/36 |
| 2020/0212704 A1 * | 7/2020 | Eftimie | H02J 50/10 |
| 2020/0395852 A1 * | 12/2020 | Yoo | H02M 1/14 |
| 2021/0067033 A1 * | 3/2021 | Jing | H02M 3/158 |
| 2022/0140651 A1 * | 5/2022 | Eftimie | H02J 7/00714 |
| | | | 320/108 |
| 2022/0149644 A1 * | 5/2022 | Liu | H02J 7/345 |
| 2022/0190714 A1 * | 6/2022 | Ye | H02M 3/07 |
| 2022/0224231 A1 * | 7/2022 | Rizzolatti | H02M 1/0095 |

FOREIGN PATENT DOCUMENTS

| | | |
|---|---|---|
| CN | 113612386 A | 11/2021 |
| CN | 113824196 A | 12/2021 |
| WO | 2019005047 A1 | 1/2019 |

* cited by examiner

POWER CONVERSION STRUCTURE, POWER CONVERSION METHOD, ELECTRONIC DEVICE INCLUDING POWER CONVERSION STRUCTURE, AND CHIP UNIT

PRIORITY CLAIM

This disclosure claims the benefit of and priority to Chinese patent Application No. 202210168842.2, filed on Feb. 24, 2022, which is hereby incorporated by reference in its entirety.

TECHNICAL FIELD

The present disclosure relates to the field of power supplies, and in particular relates to a power conversion structure, a power conversion method, an electronic device including the power conversion structure, and a chip unit.

BACKGROUND

As technology continues to advance, various electronic devices, such as portable devices (including cell phones, tablet computers, digital cameras, MP3 players, watches, and/or other similar electronic devices) have become popular. Each electronic device may employ a plurality of chargeable battery units connected in series and/or in parallel to form a chargeable battery for storing electric energy. The chargeable battery can be charged by an adapter connected to the electronic device and a power conversion structure in the electronic device, thus recovering the energy of the battery, and the chargeable battery may be various types of batteries such as Li-ion batteries.

There are a variety of power conversion structures suitable for charging the chargeable batteries. Please refer to a typical buck converter shown in FIG. 1 and a three-level buck converter shown in FIG. 2, which both are inductor-based step-down converters and are widely used in the power conversion structures for charging the batteries. In FIG. 1, a switch S1, a switch S2, an inductor L, an input-side capacitor Cin and an output-side capacitor Cout form a typical buck converter. In FIG. 2, a switch S1, a switch S2, a switch S3, a switch S4, an inductor L, a flying capacitor Cf, an input-side capacitor Cin and an output-side capacitor Cout form a typical three-level buck converter. However, the above two converters have low efficiency. For example, the efficiency of the typical buck converter shown in FIG. 1 is about 92%, and the efficiency of the typical three-level buck converter shown in FIG. 2 is about 95.5%, which cannot meet the market demands for rapid charging, high efficiency and small size of power conversion structure. Please refer to a typical switched capacitor converter shown in FIG. 3 and a typical two-phase switched capacitor converter shown in FIG. 4, which may achieve a transformation ratio with an input to output ratio of 1:1 or 2:1. In FIG. 3, a switch S1, a switch S2, a switch S3, a switch S4, a flying capacitor Cf, an input-side capacitor Cin and an output-side capacitor Cout form a typical switched capacitor converter. In FIG. 4, switch S1-S8, flying capacitors Cf1 and Cf2, an input-side capacitor Cin and an output-side capacitor Cout form a typical two-phase switched capacitor converter. The switched capacitor converter is widely used due to its compact structure and high efficiency, especially the typical two-phase switched capacitor converter shown in FIG. 4.

With the development of the power supply technology, the power conversion structure formed by the inductor-based step-down converter and the switched capacitor converter has been approved to charge the chargeable battery. The power conversion structure has the advantages of both the inductor-based step-down converter and the switched capacitor converter, and can be flexibly configured to meet the demands of different charging stages of the battery. The battery includes a trickle charging stage, a pre-charging stage, a constant-current charging stage, a constant-voltage charging stage and a charging termination stage. However, an existing cooperation scheme of the inductor-based step-down converter and the switched capacitor converter cannot achieve low cost and high efficiency on the basis of satisfying fast charging.

SUMMARY

A power conversion structure is provided by the present disclosure, including an input terminal receiving an input voltage; a first switch series branch including a plurality of switches connected in series and including a first terminal, a second terminal, a third terminal, a first upper plate node, and a first lower plate node, wherein the first terminal of the first switch series branch is connected to the input terminal, the second terminal of the first switch series branch is connected to a ground terminal, and the third terminal of the first switch series branch is connected to a first terminal of an inductor; a first flying capacitor connected between the first upper plate node and the first lower plate node; a first switch connected between a second terminal of the inductor and a first output terminal and having a first control node; a second switch connected between the third terminal of the first switch series branch and the first output terminal and having a second control node; a second switch series branch including a plurality of switches connected in series and including a first terminal, a second terminal, a third terminal, a second upper plate node and a second lower plate node, wherein the first terminal of the second switch series branch is connected to the input terminal, the second terminal of the second switch series branch is connected to the ground, and the third terminal of the second switch series branch is connected to the first output terminal; a second flying capacitor connected between the second upper plate node and the second lower plate node, wherein the power conversion structure has a first operating mode: the second switch is turned on, the first switch is turned off, the first switch series branch and the first flying capacitor form a first phase switched capacitor converter, and the second switch series branch and the second flying capacitor form a second phase switched capacitor converter; the first phase switched capacitor converter operates to generate a first output signal at the first output terminal via the on-state second switch, and the second phase switched capacitor converter operates to generate a second output signal at the first output terminal.

An electronic device is further provided by the present disclosure, including the power conversion structure; a battery, wherein a first terminal of the battery is connected to the first output terminal, and a second terminal of the battery is grounded; and a load connected to the second terminal of the inductor to receive an electric signal output from the second terminal of the inductor.

A power conversion method is further provided by the present disclosure, including: providing a power conversion structure, the power conversion structure includes a first switch series branch including a plurality of switches connected in series and including a first terminal, a second terminal, a third terminal, a first upper plate node, and a first lower plate node, wherein the first terminal of the first switch series branch is configured to receive an input voltage, the second terminal of the first switch series branch is connected to the ground, and the third terminal of the first switch series branch is connected to a first terminal of an inductor; a first flying capacitor connected between the first upper plate node and the first lower plate node; a first switch connected between a second terminal of the inductor and a first output terminal and having a first control node; a second switch connected between the third terminal of the first switch series branch and the first output terminal and having a second control node; a second switch series branch including a plurality of switches connected in series and comprising a first terminal, a second terminal, a third terminal, a second upper plate node, and a second lower plate node, wherein the first terminal of the second switch series branch is configured to receive the input voltage, the second terminal of the second switch series branch is connected to the ground, and the third terminal of the second switch series branch is connected to the first output terminal; and a second flying capacitor connected between the second upper plate node and the second lower plate node; providing the input voltage; and connecting the first output terminal of the power conversion structure to a battery, wherein at a constant-current charging stage of the battery, configuring the second switch series branch and the second flying capacitor as a N:1 switched capacitor converter, configuring the first switch series branch and the first flying capacitor as a N:1 switched capacitor converter, wherein N is an integer greater than or equal to 1, and turning on the second switch and turning off the first switch, such that an output signal formed at the third terminal of the first switch series branch generates a first output signal at the first output terminal via the on-state second switch, and an output signal formed at the third terminal of the second switch series branch generates a second output signal at the first output terminal, and the first output signal and the second output signal commonly perform constant-current charging on the battery.

A chip unit is further provided by the present disclosure, including an input pin receiving an input voltage; a third switch connected between the input pin and a first upper plate node and having a third control node; a fourth switch connected between the first upper plate node and a first intermediate node and having a fourth control node, wherein the first intermediate node is connected to a conversion pin, and the conversion pin is configured to connect a first terminal of an inductor located outside of the chip unit; a fifth switch connected between the first intermediate node and the first lower plate node and having a fifth control node; a sixth switch connected between the first lower plate node and a ground pin and having a sixth control node; a second switch connected between the first intermediate node and a battery terminal pin and having a second control node, wherein the battery terminal pin is configured to connect a battery located outside of the chip unit; a first flying capacitor upper pin connected to the first upper plate node and configured to connect a first terminal of a first flying capacitor located outside of the chip unit; a first flying capacitor lower pin connected to the first lower plate node and configured to connect a second terminal of the first flying capacitor located outside of the chip unit; a seventh switch connected between the input pin and a second upper plate node and having a seventh control node; an eighth switch connected between the second upper plate node and a second intermediate node and having an eighth control node, wherein the second intermediate node is connected to the battery terminal pin; a ninth switch connected between the second intermediate node and a second lower plate node and having a ninth control node; a tenth switch connected between the second lower plate node and the ground pin and having a tenth control node; a second flying capacitor upper pin connected to the second upper plate node and configured to connect a first terminal of a second flying capacitor located outside of the chip unit; a second flying capacitor lower pin connected to the second lower plate node and configured to connect a second terminal of the second flying capacitor located outside of the chip unit; a first switch connected between a system terminal pin and the battery terminal pin and having a first control node, wherein the system terminal pin is connected to a second terminal of the inductor located outside of the chip unit, and the chip unit has a first operating mode: the second switch is turned on, the first switch is turned off, the third switch, the fourth switch, the fifth switch, the sixth switch and the first flying capacitor form a first phase switched capacitor converter; the seventh switch, the eighth switch, the ninth switch, the tenth switch and the second flying capacitor form a second phase switched capacitor converter; the first phase switched capacitor converter operates to generate a first output signal at the battery terminal pin via the on-state second switch, and the second phase switched capacitor operates to generate a second output signal at the battery terminal pin.

DETAILED DESCRIPTION OF ILLUSTRATIVE EMBODIMENTS

The technical solutions in the embodiments of the present disclosure are clearly and completely described below with reference to the accompanying drawings in the embodiments of the present disclosure. Apparently, the embodiments described are merely a part than all of the embodiments of the present disclosure. Based on the embodiments of the present disclosure, all other embodiments obtained by those of ordinary skill in the part without creative efforts fall within the scope of protection of the present disclosure.

Figure 1:
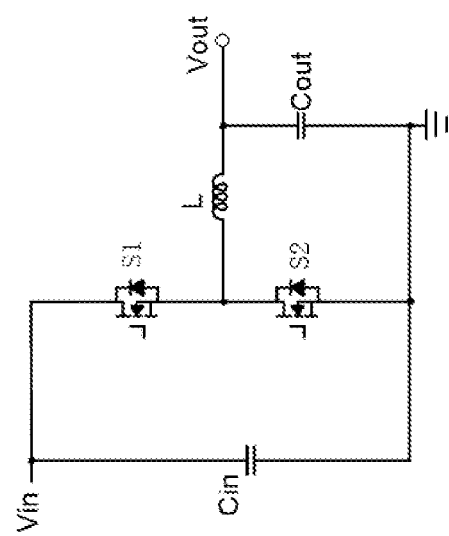
FIG. 1 is a schematic diagram of a circuit of a typical buck converter.
Figure 2:
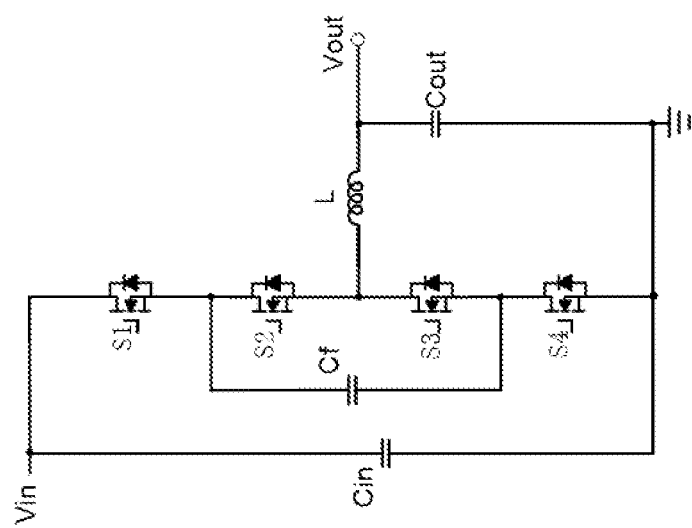
FIG. 2 is a schematic diagram of a typical three-level buck converter.
Figure 3:
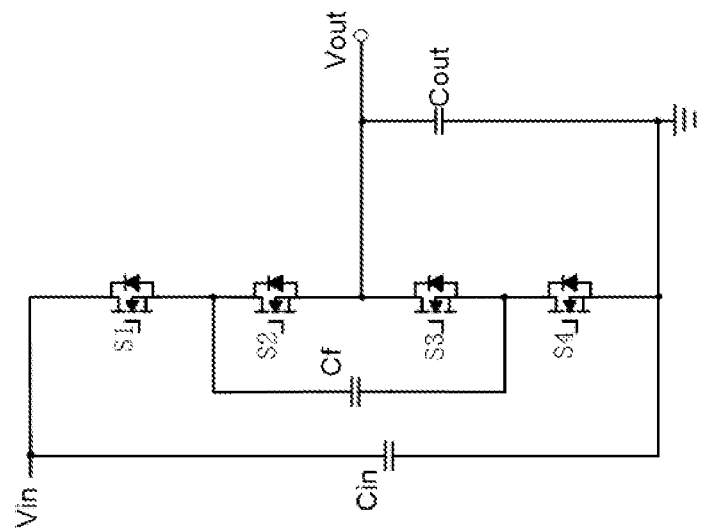
FIG. 3 is a schematic diagram of a typical switched capacitor converter.
Figure 4:
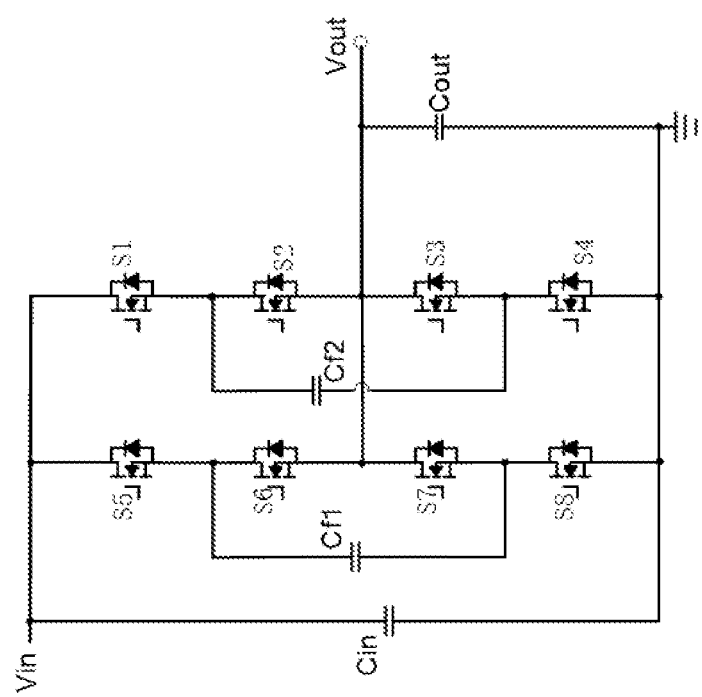
FIG. 4 is a schematic diagram of a typical two-phase switched capacitor converter.
Figure 5:
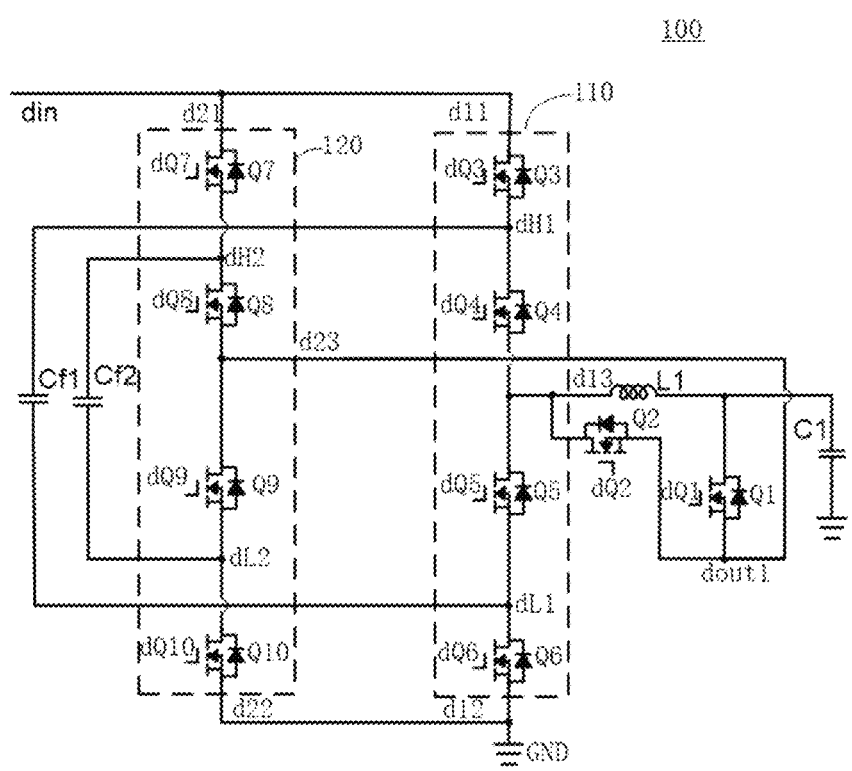
FIG. 5 is a schematic diagram of a power conversion structure in accordance with an embodiment of the present disclosure.

In an embodiment of the present disclosure, a power conversion structure is provided, which can be applied to an electronic device, specifically referring to a schematic diagram of a power conversion structure in accordance with an embodiment of the present disclosure shown in FIG. 5. The power conversion structure 100 includes an input terminal din receiving an input voltage Vin; a first switch series branch 110 including a plurality of switches connected in series, and including a first terminal d11, a second terminal d12, a third terminal d13, a first upper plate node dH1 and a first lower plate node dL1, wherein the first terminal d11 of the first switch series branch 110 is connected to the input terminal din, the second terminal d12 of the first switch series branch 110 is connected to a ground terminal GND, and the third terminal d13 of the first switch series branch 110 is connected to a first terminal of an inductor L1; a first flying capacitor Cf1 connected between the first upper plate node dH1 and the first lower plate node dL1; a first switch Q1 connected between a second terminal of the inductor L1 and a first output terminal dout1 and having a first control node dQ1; a second switch Q2 connected between the third terminal d13 of the first switch series branch 110 and the first output terminal dout1 and having a second control node dQ2; a second switch series branch 120 including a plurality of switches connected in series and including a first terminal d21, a second terminal d22, a third terminal d23, a second upper plate node dH2, and a second lower plate node dL2, wherein the first terminal d21 of the second switch series branch 120 is connected to the input terminal din, the second terminal d22 of the second switch series branch 120 is connected to the ground terminal GND, and the third terminal d23 of the second switch series branch 120 is connected to the first output terminal dout1; and a second flying capacitor Cf2 connected between the second upper plate node dH2 and the second lower plate node dL2. The power conversion structure has a first operating mode: the second switch Q2 is turned on, the first switch Q1 is turned off, the first switch series branch 110 and the first flying capacitor Cf1 form a first phase switched capacitor converter, and the second switch series branch 120 and the second flying capacitor Cf2 form a second phase switched capacitor converter; the first phase switched capacitor converter operates to generate a first output signal at the first output terminal dout1 via an on-state second switch Q2, and the second phase switched capacitor converter operates to generate a second output signal at the first output terminal dout1.

As above, a bypass switch is connected in parallel between branches formed by the inductor L1 and the first switch Q1, namely, the second switch Q2. When the first switch series branch 110 and the first flying capacitor Cf1 operate in a switched capacitor converter mode, an output signal generated at the third terminal d13 of the first switch series branch is output to the first output terminal dout1 via the second switch Q2, that is, the second switch Q2 bypasses the inductor L1 and the first switch Q1. Meanwhile, the second switch series branch 120 and the second flying capacitor Cf2 operate, such that the output signal generated at the third terminal d23 of the second switch series branch is output to the first output terminal dout1. That is, a current formed by the operating of only the first switch series branch 110 and the first flying capacitor Cf1 instead of a current formed by the operating of the second switch series branch 120 and the second flying capacitor Cf2 flows through the second switch Q2, thus greatly reducing a value of the current flowing through the second switch Q2, greatly reducing the on-state loss of the second switch Q2, and improving the efficiency of the power conversion structure 100. Due to the fact that the second switch Q2 has low on-state loss and less heat generation amount, the selectivity of the second switch Q2 is larger, and the cost of the power conversion structure 100 can be reduced.

In an embodiment, as shown in FIG. 5, the third terminal d23 of the second switch series branch 120 is directly connected to the first output terminal dout1 such that when the second switch series branch 120 and the second flying capacitor Cf2 operate, the output signal generated at the third terminal d23 of the second switch series branch is directly output to the first output terminal dout1. That is, the third terminal d23 of the second switch series branch 120 and the first output terminal dout1 have almost no resistance, thus avoiding power loss. No resistance here is not absolute zero resistance, there may be an extremely small resistance value generated by a wire but no resistance generated by a device (e.g., a switch).

Please refer to FIG. 5 again, furthermore, in an embodiment, the first switch series branch 110 includes a third switch Q3, a fourth switch Q4, a fifth switch Q5, and a sixth switch Q6 connected in series. The third switch Q3 is connected between the input terminal din and the first upper plate node dH1 and has a third control node dQ3. The fourth switch Q4 is connected between the first upper plate node dH1 and the third terminal d13 of the first switch series branch 110 and has a fourth control node dQ4. The fifth switch Q5 is connected between the third terminal d13 of the first switch series branch 110 and the first lower plate node dL1 and has a fifth control node dQ5. The sixth switch Q6 is connected between the first lower plate node dL1 and the ground terminal GND and has a sixth control node dQ6. The second switch series branch 120 includes a seventh switch Q7, an eighth switch Q8, a ninth switch Q9, and a tenth switch Q10 connected in series. The seventh switch Q7 is connected between the input terminal din and the second upper plate node dH2, and has a seventh control node dQ7. The eighth switch Q8 is connected between the second upper plate node dH2 and the third terminal d23 of the second switch series branch 120, and has an eighth control node dQ8. The ninth switch Q9 is connected between the third terminal d23 of the second switch series branch 120 and the second lower plate node dL2, and has a ninth control node dQ9. The tenth switch Q10 is connected between the second lower plate node dL2 and the ground terminal GND, and has a tenth control node dQ10. Thus, the third switch Q3, the fourth switch Q4, the fifth switch Q5, the sixth switch Q6 and the first flying capacitor Cf1 may form a first phase switched capacitor converter. The third switch Q3, the fourth switch Q4, the fifth switch Q5, the sixth switch Q6, the first flying capacitor Cf1 and the inductor L1 may also form a three-level buck converter. The seventh switch Q7, the eighth switch Q8, the ninth switch Q9, the tenth switch Q10 and the second flying capacitor Cf2 may form a second phase switch capacitor converter. Specific structures of the first switch series branch 110 and the second switch series branch 120 shown in FIG. 5 are not limited by the present disclosure, as long as the first switch series branch 110 and the first flying capacitor Cf1 may form the switched capacitor converter, the first switch series branch 110, the first flying capacitor Cf1 and the inductor L1 may form the three-level buck converter, and the second switch series branch 120 and the second flying capacitor Cf2 may form the switched capacitor converter.

In an embodiment of a practical application, as shown in FIG. 5, the power conversion structure 100 may further include a capacitor C1. The capacitor C1 is connected between the second terminal of the inductor L1 and the ground terminal GND to form a filtering unit together with the inductor L1.

Figure 6:
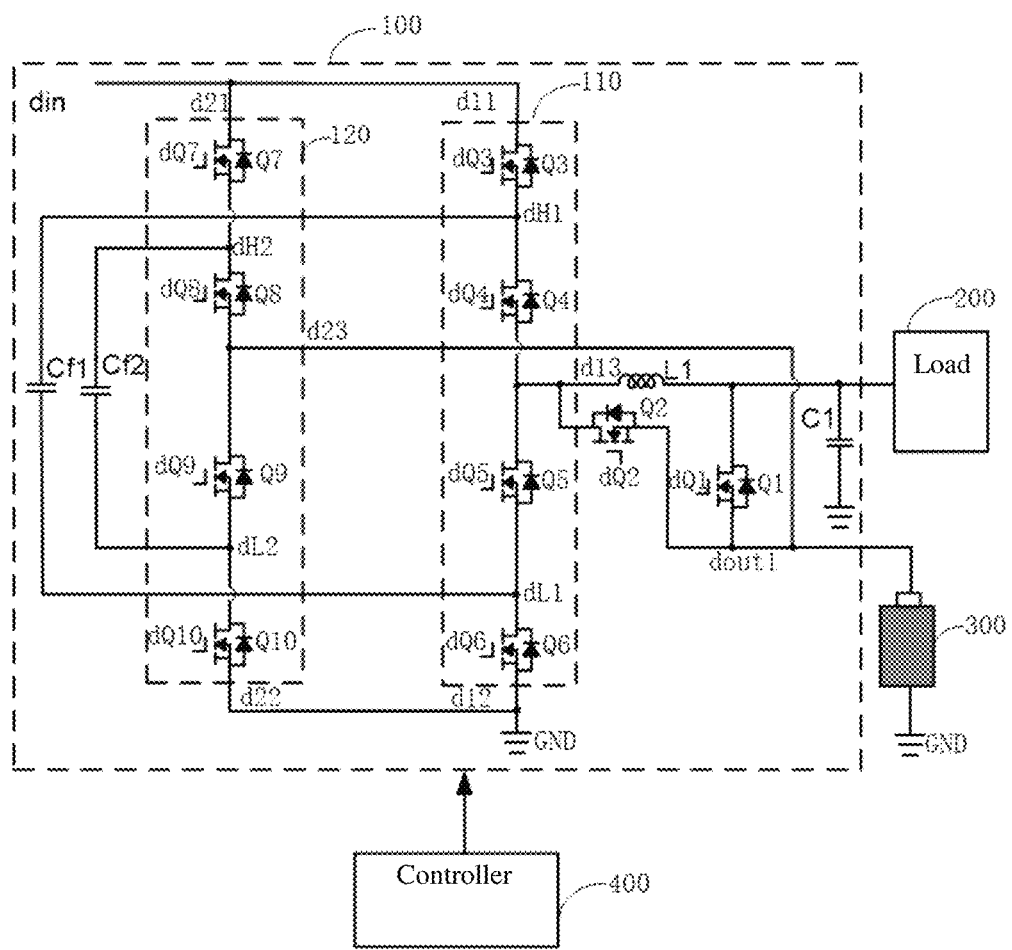
FIG. 6 is a schematic diagram of a power conversion system in accordance with an embodiment of the present disclosure.

In an embodiment of practical application, please refer to a schematic diagram of a power conversion system in accordance with an embodiment of the present disclosure shown in FIG. 6, the first output terminal dout1 of the power conversion structure 100 may be connected to a battery 300 so as to charge the battery 300. In an embodiment, the battery 300 may be a chargeable battery in the electronic device, such as the chargeable batteries in portable devices (including cell phones, tablet computers, digital cameras, MP3 players, watches, and/or other similar electronic devices).

In an embodiment of the practical application, please refer to FIG. 6, the second terminal of the inductor L1 may be connected to a load 200. The load 200 may be a power-consuming unit of an electronic device, such as power-consuming units of portable devices (including cell phones, tablet computers, digital cameras, MP3 players, watches, and/or other similar electronic devices).

In an embodiment of the practical application, please refer to FIG. 6, the power conversion system may further include a controller 400. The controller 400 is connected to the first control node dQ1 to the tenth control node dQ10 to output a switch control signal to the first control node dQ1 to the tenth control node dQ10, thus configuring the power conversion structure 100 to operate. In an embodiment, the controller 400 configures the power conversion structure 100 such that the power conversion structure 100 can be controlled to operate in a first operating mode when the input terminal din receives an input voltage Vin. Specifically, in the first operating mode, the third switch Q3, the fourth switch Q4, the fifth switch Q5, and the sixth switch Q6 operate, the second switch Q2 is turned on, and the first switch Q1 is turned off, such that the first phase switched capacitor converter formed by the third switch Q3, the fourth switch Q4, the fifth switch Q5, the sixth switch Q6 and the first flying capacitor Cf1 generates the first output signal at the first output terminal dout1 via the on-state second switch Q2. The seventh switch Q7, the eighth switch Q8, the ninth switch Q9 and the tenth switch Q10 operate, such that the second phase switched capacitor converter formed by the seventh switch Q7, the eighth switch Q8, the ninth switch Q9, the tenth switch Q10 and the second flying capacitor Cf2 generates the second output signal at the first output terminal dout1. The first output signal and the second output signal commonly charge the battery 300 connected to the first output terminal dout1.

In an embodiment of the present disclosure, when the power conversion structure 100 operates in the first operating mode, a transformation ratio between an input voltage at the input terminal din and an output voltage at the first output terminal dout1 can be achieved as N:1, wherein N is an integer greater than or equal to 1. The power conversion structure 100 usually operates in a low-voltage mode with a transformation ratio of 2:1 or a high-voltage mode with a transformation ratio of 1:1. In an embodiment, the operating principle of the power conversions structure is illustrated in a low-voltage mode in which a transformation ratio between the input voltage of the input terminal din and the output voltage of the first output terminal dout1 is 2:1.

Figure 7:
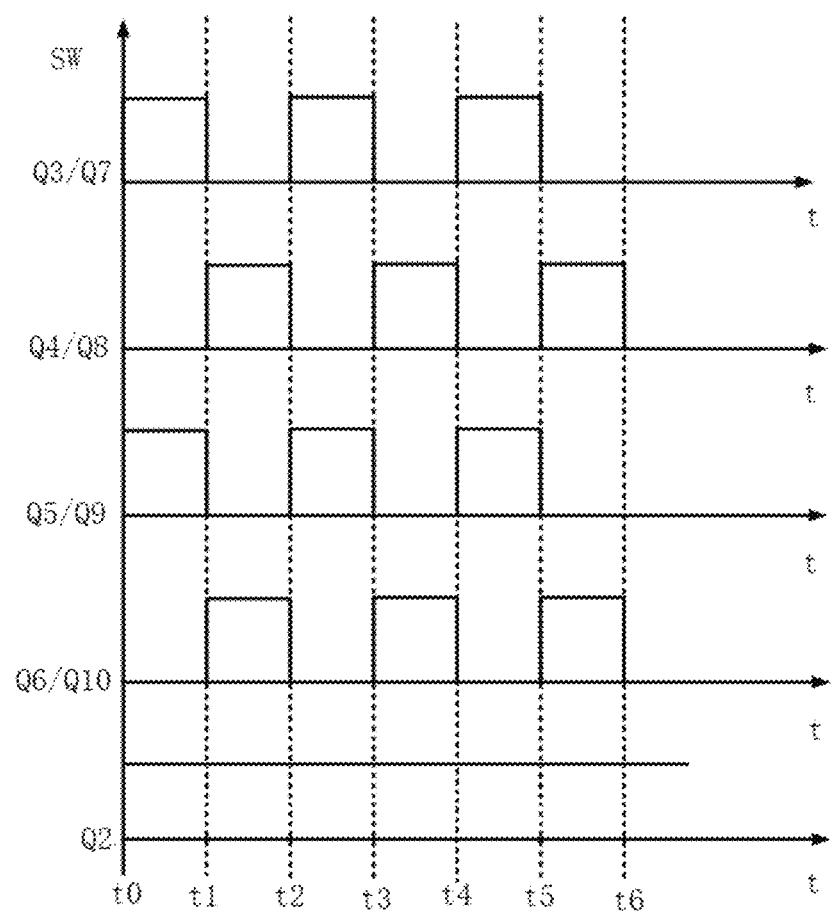
FIG. 7 is a schematic diagram of an operating waveform of a power conversion system in accordance with an embodiment of the present disclosure.

Specifically, please refer to a schematic diagram of an operating waveform of a power conversion structure in accordance with an embodiment of the present disclosure shown in FIG. 7, wherein the horizontal axis is time t and the vertical axis is a switch control signal SC. Firstly, at the t0 time, the third switch Q3, the fifth switch Q5 and the second switch Q2 are turned on and the fourth switch Q4 and the sixth switch Q6 are turned off to form a current path passing through an input voltage positive terminal, the third switch Q3, the first flying capacitor Cf1, the fifth switch Q5, the second switch Q2, the battery 300 and an input voltage negative terminal, thus making the first flying capacitor Cf1 store energy; and the seventh switch Q7 and the ninth switch Q9 are turned on and the eighth switch Q8 and the tenth switch Q10 are turned off to form a current path passing through the input voltage positive terminal, the seventh switch Q7, the second flying capacitor Cf2, the ninth switch Q9, the battery 300 and the input voltage negative terminal, thus making the second flying capacitor Cf2 store energy. Afterwards, at the t1 time, the fourth switch Q4, the sixth switch Q6 and the second switch Q2 are turned on and the third switch Q3 and the fifth switch Q5 are turned off to form a current path passing through the first flying capacitor Cf1, the fourth switch Q4, the second switch Q2, the battery 300 and the sixth switch Q6, thus discharging the first flying capacitor Cf1; and the eighth switch Q8 and the tenth switch Q10 are turned on and the seventh switch Q7 and the ninth switch Q9 are turned off to form a current path passing through the second flying capacitor Cf2, the eighth switch Q8, the battery 300 and the tenth switch Q10, thus discharging the second flying capacitor Cf2. Therefore, the third switch Q3 and the seventh switch Q7, the fourth switch Q4 and the eighth switch Q8, the fifth switch Q5 and the ninth switch Q9, and the sixth switch Q6 and the tenth switch Q10 operate circularly in above switching cycle, such that the function of the two-phase switched capacitor converter is realized to charge the battery 300. Therefore, the third switch Q3, the fourth switch Q4, the fifth switch Q5, the sixth switch Q6 and the first flying capacitor Cf1 form the first phase switched capacitor converter. The seventh switch Q7, the eighth switch Q8, the ninth switch Q9, the tenth switch Q10 and the second flying capacitor Cf2 form the second phase switched capacitor converter. The first phase switched capacitor converter operates to generate the first output signal at the first output terminal dout1 via the on-state second switch Q2, the second phase switched capacitor converter operates to generate the second output signal at the first output terminal dout1, and the first phase switched capacitor converter and the second phase switched capacitor converter operate in parallel. More specifically, in the process that the first phase switched capacitor converter and the second phase switched capacitor converter operate in parallel, it is expected that, at the same time, a resistance of a current path formed in the process of generating the first output signal is equal to a resistance of a current path formed in the process of generating the second output signal. That is, the resistance between the first phase switched capacitor converter and the second phase switched capacitor converter is balanced to guarantee stable and reliable operation of the power conversion structure 100. In the low-voltage mode with a transformation ratio of 2:1 shown in FIG. 7, at the same time, such as the time t0, the third switch Q3, the fifth switch Q5 and the second switch Q2 of the first phase switched capacitor converter are turned on simultaneously, the seventh switch Q7 and the ninth switch Q9 in the second phase switched capacitor converter are turned on simultaneously, it is expected that the sum of an on-state resistance of the seventh switch Q7 and an on-state resistance of the ninth switch Q9 is equal to the sum of an on-state resistance of the third switch Q3, an on-state resistance of the fifth switch Q5 and an on-state resistance of the second switch Q2. At the time t1, the fourth switch Q4, the sixth switch Q6 and the second switch Q2 in the first phase switched capacitor are turned on simultaneously, the eighth switch Q8 and the tenth switch Q10 in the second phase switched capacitor converter are turned on simultaneously, it is expected that the sum of an on-state resistance of the eighth switch Q8 and an on-state resistance of the tenth switch Q10 is equal to the sum of an on-state resistance the fourth switch Q4, an on-state resistance of the sixth switch Q6 and the on-state resistance of the second switch Q2. Therefore, the resistance balance between the first phase switched capacitor converter and the second phase switched capacitor converter can be guaranteed to guarantee stable and reliable operation of the power conversion structure 100. Similarly, in the high-voltage mode with a transformation ratio of 1:1, it is expected that the sum of the on-state resistance of the seventh switch Q7 and the on-state resistance of the eighth switch Q8 is equal to the sum of the third switch Q3, the on-state resistance of the fourth switch Q4 and the on-state resistance of the second switch Q2. Therefore, the resistance balance between the first phase switched capacitor converter and the second phase switched capacitor converter can be guaranteed to guarantee stable and reliable operation of the power conversion structure 100. Furthermore, in order to guarantee the resistance balance between the first phase switched capacitor converter and the second phase switched capacitor converter in each of the low-voltage mode with a transformation ratio of 2:1 and the high-voltage mode with a transformation ratio of 1:1, on the basis of satisfying the resistance balance between the first phase switched capacitor converter and the second phase switched capacitor converter in the low-voltage mode with a transformation ratio of 2:1, it is also satisfied that the on-state resistance of the fourth switch Q4 is equal to the on-state resistance of the fifth switch Q5, and the on-state resistance of the eighth switch Q8 is equal to the on-state resistance of the ninth switch Q9.

In an embodiment, in order to guarantee that the sum of the on-state resistance of the seventh switch Q7 and the on-state resistance of the ninth switch Q9 is equal to the sum of the on-state resistance of the third switch Q3, the on-state resistance of the fifth switch Q5 and the on-state resistance of the second switch Q2, and the sum of the on-state resistance of the eighth switch Q8 and the on-state resistance of the tenth switch Q10 is equal to the sum of the on-state resistance of the fourth switch Q4, the on-state resistance of the sixth switch Q6 and the on-state resistance of the second switch Q2, the third switch Q3, the fourth switch Q4, the fifth switch Q5, the sixth switch Q6 and the second switch Q2 which have the on-state resistances smaller than the seventh switch Q7, the eighth switch Q8, the ninth switch Q9 and the tenth switch Q10 may be selected, or the seventh switch Q7, the eighth switch Q8, the ninth switch Q9 and the tenth switch Q10 which have the on-state resistances larger than the third switch Q3, the fourth switch Q4, the fifth switch Q5, the sixth switch Q6 and the second switch Q2 may be selected. For example, the on-state resistance of the second switch Q2 is equal to the sum of the on-state resistance of the seventh switch Q7 and the on-state resistance of the ninth switch Q9 minus the sum of the on-state resistance of the third switch Q3 and the on-state resistance of the fifth switch Q5, and the on-state resistance of the second switch Q2 is equal to the sum of the on-resistance of the eighth switch Q8 and the on-state resistance of the tenth switch Q10 minus the sum of the on-state resistance of the fourth switch Q4 and the on-state resistance of the sixth switch Q6. Therefore, the resistance balance between the first phase switched capacitor converter and the second phase switched capacitor converter is achieved. For the solution that the seventh switch Q7, the eighth switch Q8, the ninth switch Q9 and the tenth switch Q10 employ a switch having a larger on-state resistance, the selectivity of the seventh switch Q7, the eighth switch Q8, the ninth switch Q9 and the tenth switch Q10 is larger, thus the cost of the power conversion structure 100 can be reduced. For the high-voltage mode with a transformation ratio of 1:1, the selection principle of the switch is similar to that of the low-voltage mode with a transformation ratio of 2:1. As such, unnecessary details are not given here.

In an embodiment of the practical application, the first operating mode in which the first phase switched capacitor converter is connected to the second phase switched capacitor converter in parallel is configured to perform a constant-current charging stage on the battery 300. The constant-current charging stage takes most of the time of the whole charging process of the battery and is configured to fast charge the battery. Therefore, it is expected that in the constant-current charging stage, the higher power level the power conversion structure can provide is the better. The power conversion structure shown in FIG. 5 may provide a parallel structure of the two phase switched capacitor converters so as to meet the speed of fast charging. The two-phase parallel structure has smaller total resistance and power loss in comparison with a one-phase structure. Therefore, more current may flow through the power path to further improve the power level of the power conversion structure and further improve the charging speed of the battery.

In an embodiment of the practical application, in the first operating mode in which the first phase switched capacitor converter is connected to the second phase switched capacitor converter in parallel, the first phase switched capacitor converter and the second phase switched capacitor converter may also operate in an interleaved parallel mode, as shown in FIG. 5, controlling the third switch Q3, the fifth switch Q5 and the second switch Q2 to be turned on to form the first phase switched capacitor converter, and controlling the eighth switch Q8 and the tenth switch Q10 to be turned on to form the second phase switched capacitor converter; or controlling the fourth switch Q4, the sixth switch Q6 and the second switch Q2 to be turned on to form the first phase switched capacitor converter, and controlling the seventh switch Q7 and the ninth switch Q9 to be turned on to form the second phase switched capacitor converter. Compared with one phase switched capacitor converter, the generated voltages or current ripples are smaller, and the conversion efficiency of the power conversion structure is improved. In the interleaved parallel mode, the resistance balance principle thereof is the same as the operating mode shown in FIG. 7. As such, unnecessary details are not given here.

In an embodiment of the practical application, it is expected that the first output terminal dout1 can output a relatively stable output voltage to charge the battery 300, thus improving the service life of an electronic device. However, the voltage of the input voltage Vin received by the input terminal din of the power conversion structure 100 is not a constant voltage and usually fluctuates to a certain extent, resulting in a large fluctuation of the output voltage output from the first output terminal dout1, especially for the gradually emerging wireless charging, the fluctuation of the input voltage Vin received by the input terminal din is larger. In order to guarantee that the first output terminal dout1 outputs the relatively stable output voltage, it is expected to improve the controllability of the output voltage output from the first output terminal dout1. Based on this, the plurality of operating modes further have a second operating mode. In the second operating mode, the power conversion structure 100 is configured such that the third switch Q3, the fourth switch Q4, the fifth switch Q5 and the sixth switch Q6 operate, the first switch Q1 is turned on, the second switch Q2 is turned off, so that a three-level buck converter formed by the third switch Q3, the fourth switch Q4, the fifth switch Q5, the sixth switch Q6, the first flying capacitor Cf1 and the inductor L1 generates a first output signal at the first output terminal dout1 via the on-state first switch Q1. The seventh switch Q7, the eighth switch Q8, the ninth switch Q9 and the tenth Q10 operate, so that a switched capacitor converter formed by the seventh switch Q7, the eighth switch Q8, the ninth switch Q9, the tenth switch Q10 and the second flying capacitor Cf2 generates a second output signal at the first output terminal dout1; and the first output signal and the second output signal commonly charge the battery 300 connected to the first output terminal dout1. In the second operating mode, the second switch Q2 is in an off state to make the third switch Q3, the fourth switch Q4, the fifth switch Q5, the sixth switch Q6, the first flying capacitor Cf1 and the inductor L1 form the three-level buck converter. Therefore, the switched capacitor converter and the three-level buck converter operate in parallel to charge the battery 300, and the advantages of the flexible output voltage regulation of the three-level buck converter and the high power of the switched capacitor converter can be combined to provide a relatively stable voltage for the battery 300 with high power. The output signal generated by the switched capacitor converter formed by the seventh switch Q7, the eighth switch Q8, the ninth switch Q9, the tenth Q10 and the second flying capacitor Cf2 has almost no resistance on a path of outputting to the first output terminal dout1, so that the efficiency of the power conversion structure is greatly improved. Furthermore, in the second operating mode, the three-level buck converter also supplies power to a load 200 connected to the second terminal of the inductor L1. That is, the power conversion structure can supply power to the power-consuming unit of the electronic device in the process of charging the battery 300 of the electronic device.

In an embodiment of the practical application, in above first operating mode and second operating mode, the power conversion structure 100 performs a constant-current charging stage on the battery 300. In an embodiment of the practical application, the overall charging process of the battery 300 includes a trickle charging stage, a pre-charging stage, a constant-voltage charging stage, a constant-current charging stage, and a charging termination stage. Furthermore, when the battery 300 is in the trickle charging stage, the pre-charging stage and the constant-voltage charging stage, the power conversion structure 100 is configured to operate in a third operating mode. In the third operating mode, a controller 400 controls the first switch Q1 to be in a saturation state or a completely on state, and controls the third switch Q3, the fourth switch Q4, the fifth switch Q5 and the sixth switch Q6 to operate, thus enabling the three-level buck converter formed by the third switch Q3, the fourth switch Q4, the fifth switch Q5, the sixth switch Q6, the first flying capacitor Cf1 and the inductor L1 to charge the battery 300 connected to the first output terminal dout1 via the first switch Q1 in a saturation state or a completely on state. Meanwhile, the three-level buck converter further supplies power to the load 200 connected to the second terminal of the inductor L1. That is, the power conversion structure can supply power to the power-consuming unit of the electronic device in the process of charging the battery 300 of the electronic device. Furthermore, in the charging termination stage of the battery 300, the power conversion structure 100 is configured to operate in a fourth operating mode. In the fourth operating mode, the controller 400 controls the first switch Q1 to be turned off and controls the third switch Q3, the fourth switch Q4, the fifth switch Q5 and the sixth switch Q6 to operate, thus enabling the three-level buck converter formed by the third switch Q3, the fourth switch Q4, the fifth switch Q5, the sixth switch Q6, the first flying capacitor Cf1 and the inductor L1 to supply power to the load 200 connected to the second terminal of the inductor L1.

Therefore, the power conversion structure 100 provided by the present disclosure has the advantages of the first operating mode in which two phase switched capacitor converters are connected in parallel, and may also has the advantages of the second operating mode in which the three-level buck converter and the switched capacitor converter are connected in parallel. In the first operating mode, a current of only one phase switched capacitor converter flows through the second switch Q2 for the bypass. The power conversion structure may also operate in the third operating mode and the fourth operating mode. Therefore, it is possible to achieve high efficiency in the overall charging process of the battery 300 of the electronic device and a high charging speed in the constant-current charging stage while supplying power to the power-consuming unit of the electronic device (i.e., the load 200), thus making the electronic device operate stably and reliably.

In above embodiments, the first switch Q1 is configured to be turned on to charge the battery pack 300 of the electronic device while supplying power to the power-consuming unit (i.e., the load 200) of the electronic device; or, the battery 300 of the electronic device is configured to supply power to the load 200. The first switch Q1 is configured to be turned off to only charge the power-consuming unit (i.e., the load 200) of the electronic device. That is, the first switch Q1 can realize a function of power path management.

Specifically, an integration of the two-phase switched capacitor converter and the three-level buck converter is shown in FIG. 5 to improve the power level of the power supply conversion structure. Certainly, in an embodiment of the present disclosure, n second-phase switched capacitor converters connected in parallel as shown in FIG. 5 may be included, wherein n is a positive integer, and an n+1-phase switched-capacitor converter is realized. The principle is illustrated in FIG. 5 only in two phases.

In an embodiment of the present disclosure, a switch may also be connected in series between the third switch Q3 and the seventh switch Q7 and the input terminal din to achieve a function of preventing sink current.

In an embodiment of the present disclosure, each of the switches is a MOSFET, including a source, a drain, and a gate. The drain of the third switch Q3 is connected to the input terminal din, and the source of the third switch Q3 is connected to the drain of the fourth switch Q4. The source of the fourth switch Q4 is connected to the drain of the fifth switch Q5, and the source of the fifth switch Q5 is connected to the drain of the sixth switch Q6. The source of the sixth switch Q6 is grounded. A branch formed by the seventh switch Q7, the eighth switch Q8, the ninth switch Q9 and the tenth switch Q10 and a branch formed by the third switch Q3, the fourth switch Q4, the fifth switch Q5 and the sixth switch Q6 have the same connection relationship. As such, unnecessary details are not given here. The drain of the second switch Q2 is connected to the third terminal d13 of the first switch series branch 110, and the source of the second switch Q2 is connected to the first output terminal dout1. The drain of the first switch Q1 is connected to the second terminal of the inductor L1, and the source of the first switch Q1 is connected to the first output terminal dout1.

In an embodiment of the present disclosure, the switch may also be a bipolar junction transistor, a super-junction transistor, an insulated gate bipolar transistor, a GaN-based power device, and/or a similar device. If a device in the industry can be turned on or turned off by receiving a switch control signal, this device is acceptable.

In an embodiment of the present disclosure, the switches each include a single switch as an example. In the practical application, each switch may include a plurality of switches connected in series and/or in parallel.

In an embodiment of the present disclosure, the switch operation refers to that the switch is switched between an on state and an off state at a certain frequency.

Figure 8:
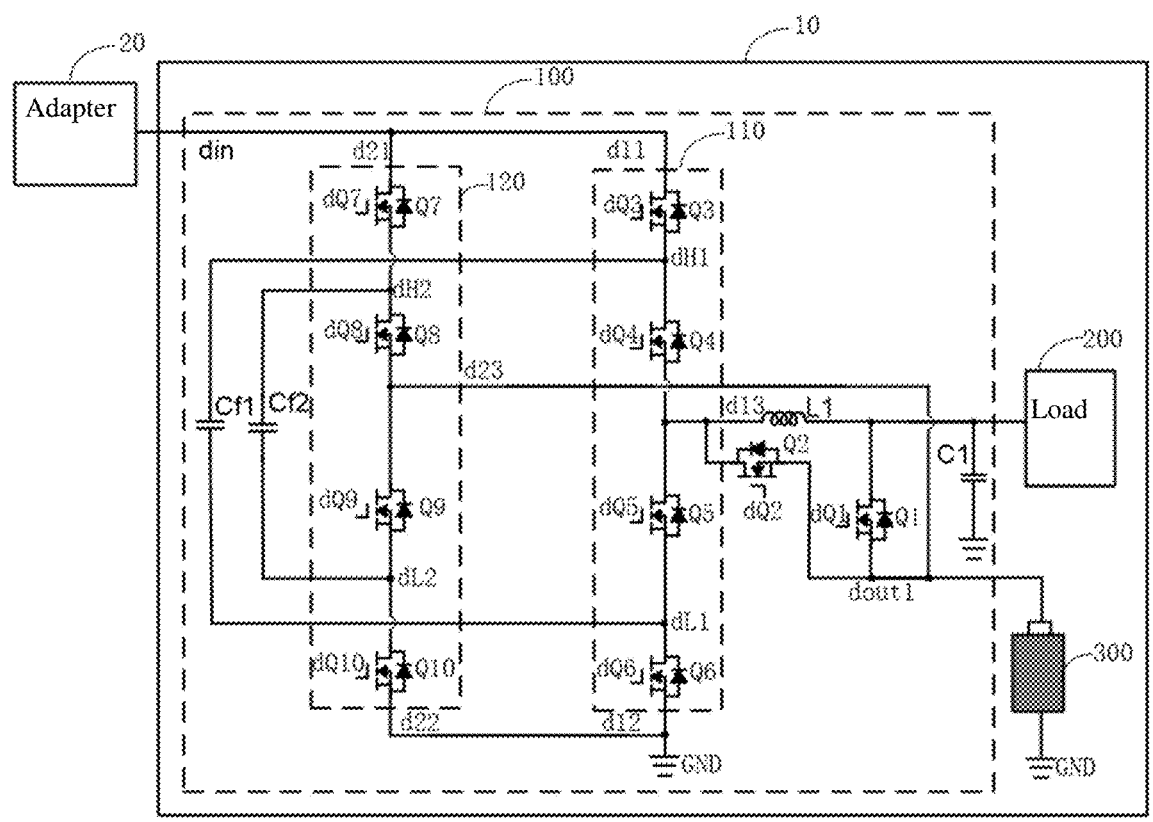
FIG. 8 is a schematic diagram of a structure of an electronic device in accordance with an embodiment of the present disclosure.

In an embodiment of the present disclosure, an electronic device 10 is further provided. The electronic device 10 may be portable devices (including cell phones, tablet computers, digital cameras, MP3 players, watches and/or other similar electronic devices). Specifically, please refer to a schematic diagram of a structure of an electronic device in accordance with an embodiment of the present disclosure shown in FIG. 8. The electronic device includes a power conversion structure, such as the power conversion structure shown in FIG. 5; a battery 300, wherein a first terminal of the battery 300 is connected to the first output terminal dout1, and a second terminal of the battery 300 is grounded; and a load 200 connected to the second terminal of the inductor L1 to receive an electric signal output from the second terminal of the inductor L1. The load 200 here is a power-consuming unit of the electronic device.

In another embodiment of the present disclosure, when the power-consuming unit in the electronic device needs power supply and/or the battery 300 in the electronic device needs to be charged, an adapter 20 is connected to the electronic device 10 to provide an input voltage Vin to the input terminal din of the power conversion structure. The power conversion structure 100 is configured to operate in a first operating mode, a second operating mode, a third operating mode, or a fourth operating mode.

Figure 9:
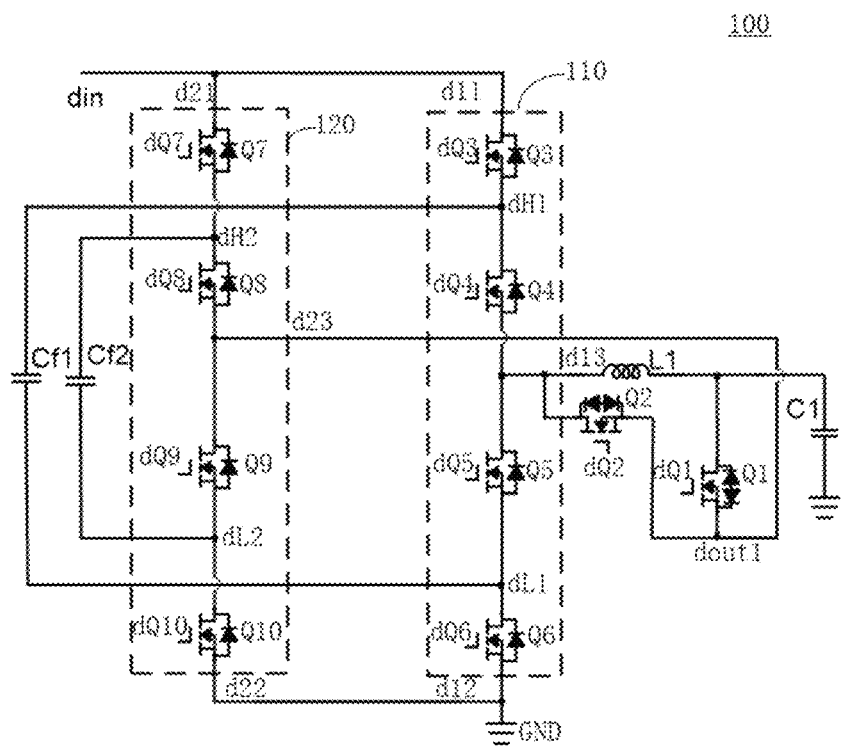
FIG. 9 is a schematic diagram of a circuit of a power conversion structure in accordance with another embodiment of the present disclosure.
Figure 10:
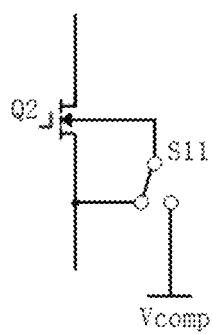
FIG. 10 is a schematic diagram of a circuit of a second switch in accordance with another embodiment of the present disclosure.

In an embodiment of the practical application, when the second switch Q2 is in an off state, it is expected that the second switch Q2 is completely turned off. Furthermore, in an embodiment of the practical application, a turn-off scenario exists when the first switch Q1 is in the off state (e.g., a ship mode), that is, the first switch Q1 is completely turned off. To this end, in the embodiments above, two parasitic diodes which are back-to-back connected in series are connected in parallel to the two terminals of the second switch Q2. Specifically, by taking the second switch Q2 as an example, anodes of the two diodes are connected together. A cathode of one diode is connected to the first terminal of the second switch Q2, and a cathode of the other diode is connected to the second terminal of the second switch Q2, thus making the two diodes back-to-back connect in series. The first switch Q1 has the same structure as the second switch Q2. As such, unnecessary details are not given here, specifically referring to a schematic diagram of a circuit of a power conversion structure in accordance with another embodiment of the present disclosure shown in FIG. 9. In another embodiment of the present disclosure, please refer to a schematic diagram of a circuit of a power conversion structure in accordance with another embodiment of the present disclosure shown in FIG. 10. A substrate B of the second switch Q2 is connected to a first selective switch S11. When the second switch Q2 needs to be turned on, the first selective switch S11 is connected to the source of the second switch Q2 (taking MOSFET as an example). When the second switch Q2 needs to be turned off, the first selective switch S11 is connected to a compensating voltage Vcomp to make the second switch Q2 be completely turned off. Similarly, the first switch Q1 has the same structure and connection relationship. As such, unnecessary details are not given here.

In an embodiment, a power conversion method is further provided. The power conversion method includes: providing a power conversion structure which may refer to the power conversion structure 100 shown in FIG. 5; and providing an input voltage to a first terminal d11 of a first switch series branch 110 and a first terminal d21 of a second switch series branch 120; and connecting a first output terminal of the power conversion structure 100 to a battery 300, please referring to FIG. 6; in a constant-current charging stage of the battery 300, configuring the second switch series branch 120 and the second flying capacitor Cf2 as a N:1 switched capacitor converter, configuring the first switch series branch 110 and the first flying capacitor Cf1 as a N:1 switched capacitor converter, wherein N is an integer greater than or equal to 1; and turning on the second switch Q2 and turning off the first switch Q1, such that an output signal formed at the third terminal d13 of the first switch series branch 110 generates a first output signal at the first output terminal dout1 via the on-state second switch Q2, and an output signal formed at the third terminal d23 of the second switch series branch 120 generates a second output signal at the first output terminal dout1, and the first output signal and the second output signal commonly perform constant-current charging on the battery 300.

Therefore, the output signal formed at the third terminal d23 by the converter formed by the second switch series branch 120 and the second flying capacitor Cf2 has almost no resistance on a path of outputting to the first output terminal dout1, so that the power loss is reduced, and the power conversion efficiency is improved. The power conversion method has the advantages of the power conversion structure as shown in FIG. 5. As such, unnecessary details are not given here.

Similarly, similar to the power conversion structure 100 shown in FIG. 5, at the same time, a resistance of a current path formed in the process of generating the first output signal is equal to a resistance of a current path formed in the process of generating the second output terminal. The principle and the functions thereof are the same as those of the power conversion structure 100 shown in FIG. 5. As such, unnecessary details are not given here. Furthermore, similar to the power conversion structure 100 shown in FIG. 5, the power conversion method further includes: configuring the second switch series branch 120 and the second flying capacitor Cf2 as a 2:1 converter; configuring the first switch series branch 110 and the first flying capacitor Cf1 as a 2:1 converter; and configuring the power conversion structure such that the sum of an on-state resistance of the seventh switch Q7 and an on-state resistance of the ninth resistance Q9 is equal to the sum of an on-state resistance of the third switch Q3, an on-state resistance of the fifth switch Q5 and an on-state resistance of the second switch Q2; and the sum of an on-state resistance of the eighth switch Q8 and an on-state resistance of the tenth switch Q10 is equal to the sum of an on-state resistance of the fourth switch Q4, an on-state resistance of the sixth switch Q6 and an on-state resistance of the second switch Q2. The principle and functions thereof are the same as those of the power conversion structure 100 shown in FIG. 5. As such, unnecessary details are not given here. Furthermore, similar to the power conversion structure 100 shown in FIG. 5, the power conversion method further include configuring the second switch series branch 120 and the second flying capacitor Cf2 as a 1:1 converter; configuring the first switch series branch 110 and the first flying capacitor Cf1 as a 1:1 converter; and configuring the power conversion structure such that the sum of the on-state resistance of the seventh switch Q7 and the on-state resistance of the eighth switch Q8 is equal to the sum of the on-state resistance of the third switch Q3, the on-state resistance of the fourth switch Q4 and the on-state resistance of the second switch Q2. The principle and functions thereof are the same as those of the power conversion structure 100 shown in FIG. 5. As such, unnecessary details are not given here. Furthermore, in order to guarantee the resistance balance between the first phase switched capacitor converter and the second phase switched capacitor converter in each of a low-voltage mode with a transformation ratio of 2:1 and a high-voltage mode with a transformation ratio of 1:1, on the basis of satisfying the resistance balance between the first phase switched capacitor converter and the second phase switched capacitor converter in the low-voltage mode with a transformation ratio of 2:1, the power conversion structure 100 is further configured such that the on-state resistance of the fourth switch Q4 is equal to the on-state resistance of the fifth switch Q5, and the on-state resistance of the eighth switch Q8 is equal to the on-state resistance of the ninth switch Q9. The principle and functions thereof are the same as those of the power conversion structure 100 shown in FIG. 5. As such, unnecessary details are not given here.

Furthermore, in the constant-current charging stage of the battery 300, the first switch series branch 110, the first flying capacitor Cf1 and the inductor L1 may further be configured as a three-level buck converter, and the second switch Q2 is turned off and the first switch Q1 is turned off, thus generating a first output signal at the first output terminal dout1. The second switch series branch 120 and the second flying capacitor Cf2 form a switched capacitor converter, and the formed switched capacitor converter and the three-level buck converter operate in parallel to charge the battery 300, such that the advantages of the flexible output voltage regulation of the three-level buck converter and the high power of the switched capacitor converter can be combined to provide a relatively stable voltage for the battery 300 with high power when the input voltage fluctuates greatly. The principle thereof is similar to that of above. As such, unnecessary details are not given here.

In an embodiment of the practical application, the overall charging process of the battery 300 includes a trickle charging stage, a pre-charging stage, a constant-voltage charging stage, a constant-current charging stage, and a charging termination stage. Furthermore, when the battery 300 in the trickle charging stage, the pre-charging stage, the constant-voltage charging stage and the charging termination stage, the operating principles and functions thereof are the same as those of the power conversion structure 100 shown in FIG. 5. As such, unnecessary details are not given here.

Therefore, the power conversion method provided by the present disclosure has the advantages of the two phase switched capacitor converters in parallel, and also can combine the advantages of the three-level buck converter and the switched capacitor converter in parallel. In the constant-current charging stage of the battery, a current of only one phase switched capacitor converter flows through the second switch Q2 for a bypass. The battery may be subjected to trickle charging, pre-charging, constant-voltage charging, and charging termination. Therefore, it is possible to achieve high efficiency in the overall charging process of the battery 300 of the electronic device while supplying power to the power-consuming unit of the electronic device (i.e., the load 200), thus making the electronic device operate stably and reliably.

Figure 11:
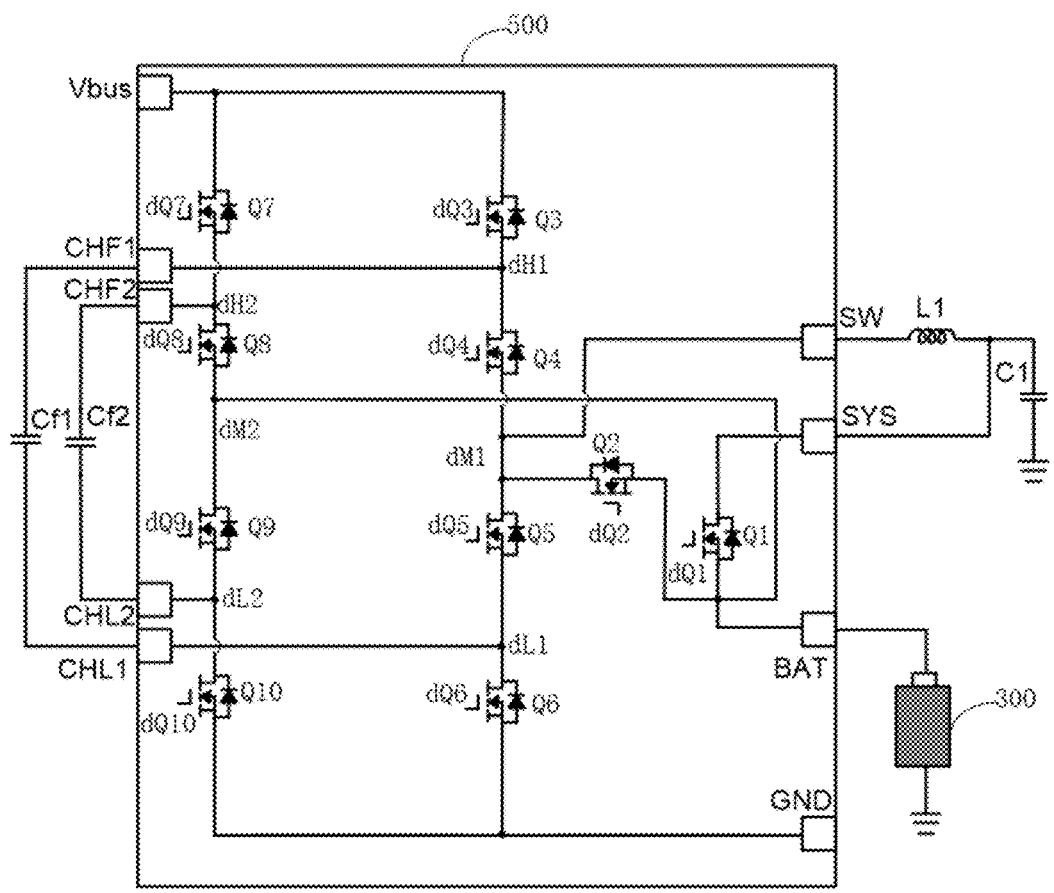
FIG. 11 is a schematic diagram of a circuit of a chip unit in accordance with another embodiment of the present disclosure.

In an embodiment of the present disclosure, a chip unit 500 is further provided, specifically referring to a schematic diagram of a chip of a chip unit in accordance with an embodiment of the present disclosure shown in FIG. 11. As shown in FIG. 11, the chip unit 500 includes an input pin Vbus, a conversion pin SW, a system terminal pin SYS, a battery terminal pin BAT, a ground pin GUN, a first flying capacitor upper pin CHF1, a first flying capacitor lower pin CHL1, a second flying capacitor upper pin CHF2, and a second flying capacitor lower pin CHL2. The chip unit 500 is internally integrated with: a third switch Q3 connected between the input pin Vbus and a first upper plate node dH1 and having a third control node dQ3; a fourth switch Q4 connected between the first upper plate node dH1 and a first intermediate node dM1 and having a fourth control node dQ4, wherein the first intermediate node dM1 is connected to the conversion pin SW which is connected to a first terminal of an inductor L1 located outside the chip unit 500; a fifth switch Q5 connected between the first intermediate node dM1 and a first lower plate node dL1 and having a fifth control node dQ5; a sixth switch Q6 connected between the first lower plate node dL1 and the ground pin GND and having a sixth control node dQ6; a second switch Q2 connected between the first intermediate node dM1 and the battery terminal pin BAT and having a second control node dQ2, wherein the battery terminal pin BAT is connected to the battery 300 located outside the chip unit 500; a first flying capacitor upper pin CHF1 connected to the first upper plate node dH1 and connected to a first terminal of a first flying capacitor Cf1 located outside the chip unit 500; a first flying capacitor lower pin CHL1 connected to the first lower plate node dL1 and connected to a second terminal of the first flying capacitor Cf1 located outside the chip unit 500; a seventh switch Q7 connected between the input pin Vbus and a second upper plate node dH2, and having a seventh control node dQ7; an eighth switch Q8 connected between the second upper plate node dH2 and a second intermediate node dM2, and having an eighth control node dQ8, wherein the second intermediate node dM2 is connected to the battery terminal pin BAT; a ninth switch Q9 connected between the second intermediate node dM2 and a second lower plate node dL2, and having a ninth control node dQ9; a tenth switch Q10 connected between the second lower plate node dL2 and the ground pin GND, and having a tenth control node dQ10; a second flying capacitor upper pin CHF2 connected to the second upper plate node dH2 and connected to a first terminal of a second flying capacitor Cf2 located outside the chip unit 500; a second flying capacitor lower pin CHL2 connected to the second lower plate node dL2 and connected to a second terminal of a second flying capacitor Cf2 located outside the chip unit 500; and a first switch Q1 connected between the system terminal pin SYS and the battery terminal pin BAT, and having a first control node dQ1, wherein the system terminal pin SYS is connected to a second terminal of the inductor L1 located outside the chip unit 500, and the input pin Vbus receives an input voltage Vin. The chip unit 500 has a first operating mode: the second switch Q2 is turned on, the first switch Q1 is turned off, the third switch Q3, the fourth switch Q4, the fifth switch Q5, the sixth switch Q6 and the first flying capacitor Cf1 form a first phase switched capacitor converter, the seventh switch Q7, the eighth switch Q8, the ninth switch Q9, the tenth switch Q10 and the second flying capacitor Cf2 form a second phase switched capacitor converter, the first phase switched capacitor converter operates to generate a first output signal at the battery terminal pin via the on-state second switch Q2, and the second phase switched capacitor converter operates to generate a second output signal at the battery terminal pin.

Similar to the above power conversion structure, in an embodiment, the second intermediate node dM2 is directly connected to the battery terminal pin BAT. The principle and functions thereof are the same as those of above power conversion structure. As such, unnecessary details are not given here.

Similar to the above power conversion structure, the sum of an on-state resistance of the seventh switch Q7 and an on-state resistance of the ninth resistance Q9 is equal to the sum of an on-state resistance of the third switch Q3, an on-state resistance of the fifth switch Q5 and an on-state resistance of the second switch Q2. The sum of an on-state resistance of the eighth switch Q8 and an on-state resistance of the tenth switch Q10 is equal to the sum of an on-state resistance of the fourth switch Q4, an on-state resistance of the sixth switch Q6 and an on-state resistance of the second switch Q2. The principle and functions thereof are the same as those of above power conversion structure. As such, unnecessary details are not given here. Furthermore, similar to the above power conversion structure, it further can be configured such that the on-state resistance of the fourth switch Q4 is equal to the on-state resistance of the fifth switch Q5, and the on-state resistance of the eighth switch Q8 is equal to the on-state resistance of the ninth switch Q9. The principle and functions thereof are the same as those of above power conversion structure. As such, unnecessary details are not given here.

Similar to the above power conversion structure, the sum of the on-state resistance of the seventh switch Q7 and the on-state resistance of the eighth switch Q8 is equal to the sum of the on-state resistance of the third switch Q3, the on-state resistance of the fourth switch Q4 and the on-state resistance of the second switch Q2. The principle and functions thereof are the same as those of above power conversion structure. As such, unnecessary details are not given here.

The switches in the chip unit shown in FIG. 11 have the same features as the switches in the power conversion structure shown in FIG. 5. As such, unnecessary details are not given here.

In accordance with the chip unit shown in FIG. 11, the integration level of the chip unit 500 can be improved by integrating the switches inside the chip unit 500 and arranging an inductor, a capacitor and other devices with larger size outside the chip 500, thus making the chip unit conform to the current demands for high integration level of power supply chips. In addition, the electric conversion function can be achieved by simply configuring a corresponding inductor and/or capacitor outside the chip cell 500, and the flexibility of the chip cell 500 application is improved. The chip unit 500 shown in FIG. 11 may operate in any one of the plurality of operating modes of the power conversion structure 100 shown in FIG. 5 in cooperation with a peripheral inductor and/or capacitor, and has the same technical effects as the power conversion structure 100 shown in FIG. 5 when operating in a switched capacitor converter.

Finally, it should be noted that the above embodiments are only used to illustrate the technical solutions of the present disclosure rather than limiting the same. Although the present disclosure has been described in detail with reference to the foregoing embodiments, it should be understood by those of ordinary skill in the art that it is still possible to modify the technical solutions recorded in the foregoing embodiments, or to equivalently replace some or all of technical features; while that these modifications or replacements do not make the essence of the corresponding technical solutions deviate from the scope of the technical solutions of the embodiments of the present disclosure.

What is claimed is:

1. A power conversion structure comprising:
an input terminal receiving an input voltage;
a first switch series branch comprising a plurality of switches connected in series and comprising a first terminal, a second terminal, a third terminal, a first upper plate node, and a first lower plate node, wherein the first terminal of the first switch series branch is connected to the input terminal, the second terminal of the first switch series branch is connected to a ground terminal, and the third terminal of the first switch series branch is connected to a first terminal of an inductor;
a first flying capacitor connected between the first upper plate node and the first lower plate node;
a first switch connected between a second terminal of the inductor and a first output terminal, the first switch comprising a first control node;
a second switch connected between the third terminal of the first switch series branch and the first output terminal, the second switch comprising a second control node;
a second switch series branch comprising a plurality of switches connected in series and comprising a first terminal, a second terminal, a third terminal, a second upper plate node and a second lower plate node, wherein the first terminal of the second switch series branch is connected to the input terminal, the second terminal of the second switch series branch is connected to the ground terminal, and the third terminal of the second switch series branch is directly connected to the first output terminal; and
a second flying capacitor connected between the second upper plate node and the second lower plate node, wherein:
in a first operating mode of the power conversion structure, the second switch is turned on and the first switch is turned off;
the first switch series branch and the first flying capacitor form a first phase switched capacitor converter;
the second switch series branch and the second flying capacitor form a second phase switched capacitor converter;
the first phase switched capacitor converter operates to generate a first output signal at the first output terminal via the second switch when the second switch is turned on; and
the second phase switched capacitor converter operates to generate a second output signal at the first output terminal.

2. The power conversion structure according to claim 1, wherein:
the first switch series branch comprises a third switch, a fourth switch, a fifth switch and a sixth switch connected in series;

the third switch is connected between the input terminal and the first upper plate node, the third switch comprising a third control node;

the fourth switch is connected between the first upper plate node and the third terminal of the first switch series branch, the fourth switch comprising a fourth control node;

the fifth switch is connected between the third terminal of the first switch series branch and the first lower plate node, the fifth switch comprising a fifth control node;

the sixth switch is connected between the first lower plate node and the ground terminal, the sixth switch comprising a sixth control node;

the second switch series branch comprises a seventh switch, an eighth switch, a ninth switch and a tenth switch connected in series;

the seventh switch is connected between the input terminal and the second upper plate node, the seventh switch comprising a seventh control node;

the eighth switch is connected between the second upper plate node and the third terminal of the second switch series branch, the eighth switch comprising an eighth control node;

the ninth switch is connected between the third terminal of the second switch series branch and the second lower plate node, the ninth switch comprising a ninth control node; and the tenth switch is connected between the second lower plate node and the ground terminal, the tenth switch comprising a tenth control node.

3. The power conversion structure according to claim 2, wherein at a same moment, a resistance of a current path formed in a process of generating the first output signal is equal to that of a current path formed in a process of generating the second output signal.

4. The power conversion structure according to claim 3, wherein a sum of an on-state resistance of the seventh switch and an on-state resistance of the ninth switch is equal to a sum of an on-state resistance of the third switch, an on-state resistance of the fifth switch and an on-state resistance of the second switch, and a sum of an on-state resistance of the eighth switch and an on-state resistance of the tenth switch is equal to a sum of an on-state resistance of the fourth switch, an on-state resistance of the sixth switch and the on-state resistance of the second switch.

5. The power conversion structure according to claim 4, wherein a sum of the on-state resistance of the seventh switch and the on-state resistance of the eighth switch is equal to a sum of the on-state resistance of the third switch, the on-state resistance of the fourth switch and the on-state resistance of the second switch.

6. The power conversion structure according to claim 4, wherein the on-state resistance of the fourth switch is equal to the on-state resistance of the fifth switch, and the on-state resistance of the eighth switch is equal to the on-state resistance of the ninth switch.

7. An electronic device comprising:
a power conversion structure comprising:
an input terminal receiving an input voltage;
a first switch series branch comprising a plurality of switches connected in series and comprising a first terminal, a second terminal, a third terminal, a first upper plate node, and a first lower plate node, wherein the first terminal of the first switch series branch is connected to the input terminal, the second terminal of the first switch series branch is connected to a ground terminal, and the third terminal of the first switch series branch is connected to a first terminal of an inductor;

a first flying capacitor connected between the first upper plate node and the first lower plate node;

a first switch connected between a second terminal of the inductor and a first output terminal, the first switch comprising a first control node;

a second switch connected between the third terminal of the first switch series branch and the first output terminal, the second switch comprising a second control node;

a second switch series branch comprising a plurality of switches connected in series and comprising a first terminal, a second terminal, a third terminal, a second upper plate node and a second lower plate node, wherein the first terminal of the second switch series branch is connected to the input terminal, the second terminal of the second switch series branch is connected to the ground terminal, and the third terminal of the second switch series branch is directly connected to the first output terminal; and a second flying capacitor connected between the second upper plate node and the second lower plate node, wherein:

in a first operating mode of the power conversion structure, the second switch is turned on and the first switch is turned off;

the first switch series branch and the first flying capacitor form a first phase switched capacitor converter;

the second switch series branch and the second flying capacitor form a second phase switched capacitor converter;

the first phase switched capacitor converter operates to generate a first output signal at the first output terminal via the second switch when the second switch is turned on; and the second phase switched capacitor converter operates to generate a second output signal at the first output terminal;

a battery, wherein a first terminal of the battery is connected to the first output terminal, and a second terminal of the battery is grounded; and a load connected to the second terminal of the inductor to receive an electric signal output from the second terminal of the inductor.

8. A power conversion method comprising:
providing a power conversion structure, wherein the power conversion structure comprises:
a first switch series branch comprising a plurality of switches connected in series and comprising a first terminal, a second terminal, a third terminal, a first upper plate node, and a first lower plate node, wherein the first terminal of the first switch series branch is configured to receive an input voltage, the second terminal of the first switch series branch is connected to a ground terminal, and the third terminal of the first switch series branch is connected to a first terminal of an inductor;

a first flying capacitor connected between the first upper plate node and the first lower plate node;

a first switch connected between a second terminal of the inductor and a first output terminal, the first switch comprising a first control node;

a second switch connected between the third terminal of the first switch series branch and the first output terminal, the second switch comprising a second control node;
a second switch series branch comprising a plurality of switches connected in series and comprising a first terminal, a second terminal, a third terminal, a second upper plate node, and a second lower plate node, wherein the first terminal of the second switch series branch is configured to receive the input voltage, the second terminal of the second switch series branch is connected to the ground terminal, and the third terminal of the second switch series branch is directly connected to the first output terminal; and
a second flying capacitor connected between the second upper plate node and the second lower plate node;
providing the input voltage;
connecting the first output terminal of the power conversion structure to a battery; and
at a constant-current charging stage of the battery, configuring the second switch series branch and the second flying capacitor as a N:1 switched capacitor converter, configuring the first switch series branch and the first flying capacitor as a N:1 switched capacitor converter, wherein N is an integer greater than or equal to 1, and turning on the second switch and turning off the first switch, such that an output signal formed at the third terminal of the first switch series branch generates a first output signal at the first output terminal via the second switch when the second switch is turned on, and an output signal formed at the third terminal of the second switch series branch generates a second output signal at the first output terminal, and the first output signal and the second output signal commonly perform constant-current charging on the battery.

9. The power conversion method according to claim 8, wherein:
the first switch series branch comprises a third switch, a fourth switch, a fifth switch and a sixth switch connected in series;
the third switch is connected between the first terminal of the first switch series branch and the first upper plate node, the third switch comprising a third control node;
the fourth switch is connected between the first upper plate node and the third terminal of the first switch series branch, the fourth switch comprising a fourth control node;
the fifth switch is connected between the third terminal of the first switch series branch and the first lower plate node, the fifth switch comprising a fifth control node;
the sixth switch is connected between the first lower plate node and the ground terminal, the sixth switch comprising a sixth control node;
the second switch series branch comprises a seventh switch, an eighth switch, a ninth switch and a tenth switch connected in series;
the seventh switch is connected between the first terminal of the second switch series branch and the second upper plate node, the seventh switch comprising a seventh control node;
the eighth switch is connected between the second upper plate node and the third terminal of the second switch series branch, the eighth switch comprising an eighth control node;

the ninth switch is connected between the third terminal of the second switch series branch and the second lower plate node, the ninth switch comprising a ninth control node; and
the tenth switch is connected between the second lower plate node and the ground terminal, the tenth switch comprising a tenth control node.

10. The power conversion method according to claim 9, wherein at a same moment, a resistance of a current path formed in a process of generating the first output signal is equal to that of a current path formed in a process of generating the second output signal.

11. The power conversion method according to claim 10, further comprising:
configuring the second switch series branch and the second flying capacitor as a 2:1 converter;
configuring the first switch series branch and the first flying capacitor as a 2:1 converter; and
configuring the power conversion structure such that a sum of an on-state resistance of the seventh switch and an on-state resistance of the ninth switch is equal to a sum of an on-state resistance of the third switch, an on-state resistance of the fifth switch and an on-state resistance of the second switch, a sum of an on-state resistance of the eighth switch and an on-state resistance of the tenth switch is equal to a sum of an on-state resistance of the fourth switch, an on-state resistance of the sixth switch and the on-state resistance of the second switch.

12. The power conversion method according to claim 10, further comprising:
configuring the second switch series branch and the second flying capacitor as a 1:1 converter;
configuring the first switch series branch and the first flying capacitor as a 1:1 converter; and
configuring the power conversion structure such that a sum of an on-state resistance of the seventh switch and an on-state resistance of the eighth switch is equal to a sum of an on-state resistance of the third switch, an on-state resistance of the fourth switch and an on-state resistance of the second switch.

13. The power conversion method according to claim 10, further comprising: configuring the power conversion structure such that an on-state resistance of the fourth switch is equal to an on-state resistance of the fifth switch, and an on-state resistance of the eighth switch is equal to an on-state resistance of the ninth switch.

14. A chip unit comprising:
an input pin receiving an input voltage;
a third switch connected between the input pin and a first upper plate node, the third switch comprising a third control node;
a fourth switch connected between the first upper plate node and a first intermediate node, the fourth switch comprising a fourth control node, wherein the first intermediate node is connected to a conversion pin, and the conversion pin is configured to connect a first terminal of an inductor located outside of the chip unit;
a fifth switch connected between the first intermediate node and a first lower plate node, the fifth switch comprising a fifth control node;
a sixth switch connected between the first lower plate node and a ground pin, the sixth switch comprising a sixth control node;
a second switch connected between the first intermediate node and a battery terminal node, the second switch comprising a second control node, wherein a battery terminal pin is configured to connect a battery located outside of the chip unit;

a first flying capacitor upper pin connected to the first upper plate node and configured to connect a first terminal of a first flying capacitor located outside of the chip unit;

a first flying capacitor lower pin connected to the first lower plate node and configured to connect a second terminal of the first flying capacitor located outside of the chip unit;

a seventh switch connected between the input pin and a second upper plate node, the seventh switch comprising a seventh control node;

an eighth switch connected between the second upper plate node and a second intermediate node, the eighth switch comprising an eighth control node, wherein the second intermediate node is directly connected to the battery terminal pin;

a ninth switch connected between the second intermediate node and a second lower plate node, the ninth switch comprising a ninth control node;

a tenth switch connected between the second lower plate node and the ground pin, the tenth switch comprising a tenth control node;

a second flying capacitor upper pin connected to the second upper plate node and configured to connect a first terminal of a second flying capacitor located outside of the chip unit;

a second flying capacitor lower pin connected to the second lower plate node and configured to connect a second terminal of the second flying capacitor located outside of the chip unit; and a first switch connected between a system terminal pin and the battery terminal pin, the first switch comprising a first control node, wherein the system terminal pin is connected to a second terminal of the inductor located outside of the chip unit, and wherein:

in a first operating mode of the chip unit, the second switch is turned on and the first switch is turned off;

the third switch, the fourth switch, the fifth switch, the sixth switch and the first flying capacitor form a first phase switched capacitor converter;

the seventh switch, the eighth switch, the ninth switch, the tenth switch and the second flying capacitor form a second phase switched capacitor converter; and the first phase switched capacitor converter operates to generate a first output signal at the battery terminal pin via the second switch when the second switch is turned on, and the second phase switched capacitor operates to generate a second output signal at the battery terminal pin.

15. The chip unit according to claim 14, wherein:

a sum of an on-state resistance of the seventh switch and an on-state resistance of the ninth switch is equal to a sum of an on-state resistance of the third switch, an on-state resistance of the fifth switch and an on-state resistance of the second switch; and a sum of an on-state resistance of the eighth switch and an on-state resistance of the tenth switch is equal to a sum of an on-state resistance of the fourth switch, an on-state resistance of the sixth switch and the on-state resistance of the second switch.

16. The chip unit according to claim 14, wherein a sum of an on-state resistance of the seventh switch and an on-state resistance of the eighth switch is equal to a sum of an on-state resistance of the third switch, an on-state resistance of the fourth switch and an on-state resistance of the second switch.

17. The chip unit according to claim 14, wherein:

an on-state resistance of the fourth switch is equal to an on-state resistance of the fifth switch; and an on-state resistance of the eighth switch is equal to an on-state resistance of the ninth switch.

\* \* \* \* \*

UNITED STATES PATENT AND TRADEMARK OFFICE
CERTIFICATE OF CORRECTION

PATENT NO. : 11,522,466 B1
APPLICATION NO. : 17/752175
DATED : December 6, 2022
INVENTOR(S) : Zhengyu Li Page 1 of 1

It is certified that error appears in the above-identified patent and that said Letters Patent is hereby corrected as shown below:

In the Claims

Claim 11, Column 22, Line 25; insert --and-- following "switch,".

Signed and Sealed this
Third Day of January, 2023

Katherine Kelly Vidal
*Director of the United States Patent and Trademark Office*